United States Patent
Loguinov et al.

(10) Patent No.: US 6,907,460 B2
(45) Date of Patent: Jun. 14, 2005

(54) METHOD FOR EFFICIENT RETRANSMISSION TIMEOUT ESTIMATION IN NACK-BASED PROTOCOLS

(75) Inventors: Dmitri Loguinov, Wappingers Falls, NY (US); Hayder Radha, Mahwah, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 719 days.

(21) Appl. No.: 09/822,441

(22) Filed: Mar. 30, 2001

(65) Prior Publication Data

US 2002/0124096 A1 Sep. 5, 2002

Related U.S. Application Data

(60) Provisional application No. 60/262,591, filed on Jan. 18, 2001.

(51) Int. Cl.$^7$ .............................................. G06F 15/173
(52) U.S. Cl. ........................ 709/224; 709/229; 370/231; 370/229; 370/389; 375/240.27
(58) Field of Search ................................ 709/224, 229; 375/240.27; 370/231, 229, 389

(56) References Cited

U.S. PATENT DOCUMENTS

| | | | | |
|---|---|---|---|---|
| 5,901,138 A | * | 5/1999 | Bader et al. | 370/229 |
| 6,208,620 B1 | * | 3/2001 | Sen et al. | 370/231 |
| 6,421,387 B1 | * | 7/2002 | Rhee | 375/240.27 |
| 6,721,316 B1 | * | 4/2004 | Epps et al. | 370/389 |

OTHER PUBLICATIONS

D. Loguinov et al; "On Retransmission Schemes for Real-Time Streaming in the Internet", Proceedings IEEE Infocom 2001 Conference on Computer Communications, vol. 3, Apr. 22–26, 2001, pp. 1310–1319, XP002202990.

* cited by examiner

*Primary Examiner*—William A. Cuchlinski, Jr.
*Assistant Examiner*—Thanh T. Nguyen

(57) ABSTRACT

Disclosed is a system and method for estimating retransmission timeout (RTO) in a real-time streaming applications over the Internet between a server and a client. Accordingly, the present invention employs retransmission timeout (RTO) in NACK-based applications to support multiple retransmission attempts per lost packet, wherein the RTO is estimated by an actual around-trip delay (RTT) and a smooth inter-packet delay variance.

12 Claims, 4 Drawing Sheets

METHOD FOR EFFICIENT RETRANSMISSION TIMEOUT ESTIMATION IN NACK-BASED PROTOCOLS

CROSS REFERENCE TO RELATED APPLICATION

This application claims the benefit of U.S. Provisional Application Ser. No. 60/262,591 filed Jan. 18, 2001, the teachings of which are incorporated herein by reference.

BACKGROUND OF THE INVENTION

1. Field of Invention

The present invention relates to retransmission timeout (RTO) estimators, and particularly, to a system and method for estimating RTO in the NACK-based real-time streaming applications that support multiple re-transmission of the same packet.

2. Description of the Invention

In general, there are two types of Internet transport protocols that support lost packet recovery in a data communication network. The first approach is ACK-based as set forth under the transmission control protocol (TCP), which involves the receiver sending a positive acknowledgment (ACK) in response to each received packet. The second approach is NACK-based under a user datagram protocol (UDP), which involves the receiver sending a negative acknowledgment (NACK) in response to each lost packet.

Referring to FIG. 1(a), TCP utilizes a system of positive acknowledgments (ACK) for data arriving to the receiving endpoint as the mechanism for error recovery. This system operates under the principle that only unacknowledged frames should be retransmitted. To ensure that the packet is safely received by the sending source, TCP uses a retransmission timeout (RTO) mechanism by managing a retransmission timer for each connection. That is, TCP sets the retransmission timer and tacks an RTO value and a round trip time (RTT) for the connection. The RTT is the time elapsed between the start of transmission of a TCP-type data segment and the receipt of an acknowledgment of that segment. If an acknowledgment is not received by the time the $RTO_1$ expires, TCP retransmits the data again within next the $RTO_2$.

In contrast, UDP utilizes a system of negative acknowledgments (NACK) by forwarding a NACK packet to the sending source in response to the lost frame for retransmission, as shown in FIG. 1(b). In addition, the NACK packet can be lost along the path from the receiver to the sender. To this end, UDP utilizes a retransmission timeout mechanism that is similar to the TCP for retransmission connection.

It is important that the estimation of an RTO value is performed accurately. Normally, the RTO estimation is performed by predicting the next value of the RTT based on the previous samples of the RTTs. If the RTO is overestimated, it leads to lower throughput performance in TCP and may cause an increased number of under-flow events in real time application. Yet, if the RTO is underestimated, the protocol generates a large number of duplicate packets that cause serious network congestion as more of unnecessary packets are retransmitted.

A background of current standards, which is based on TCP's retransmission timeout estimator, is described hereinafter. The standard consists of two algorithms described below. The first algorithm, smoothed RTT estimator (SRTT), is based on an exponential-weighed moving average (EWMA) of the past RTT samples:

$$SRTT_i = \begin{cases} RTT_0, i = 0 \\ (1 - \square) \cdot SRTT_{i-1} + \square \cdot RTT_i, i \geq 1, \end{cases} \quad (1)$$

where $RTT_i$ represents the i-th sample of the round-trip delay produced at time $t_i$ and $\square$ (set by default to ⅛) represents a smoothing factor that can be varied to give more or less weight to the history of RTT samples.

The second algorithm, smoothed RTT variance estimator (SVAR), computes an approximation to the RTT variance using similar EWMA formulas to the ones described above:

$$SVAR_i = \begin{cases} RTT_0/2, i = 0 \\ (1 - \beta) \cdot SVAR_{i-1} + \beta \cdot VAR_i, i \geq 1, \end{cases} \quad (2)$$

where $\beta$ (set by default to ¼) represents an EWMA smoothing factor and $VAR_I$ represents the absolute deviation of the i-th RTT sample from the smoothed average: $VAR_i = |SRTT_{i-1} - RTT_i|$.

Finally, the RTO is determined by multiplying the smoothed variance by four and adding it to the smoothed round-trip delay:

$$RTO(t) = SRTT_i + 4 \cdot SVAR_i, \quad (3)$$

where t represents the time at which the RTO is computed, and $i = \max : t_i \leq t$.

In real-time streaming applications, e.g., multimedia applications, NACK-based operation is preferred due to a lower overhead along the path from the receiver to the sender and potentially faster recovery of lost packets. However, the RTO estimator, as described in the preceding paragraphs, is typically suitable only for the ACK-based applications and is not applicable to NACK-based protocols by design. It produces an extended number of duplicate packets and causes unnecessary delays in the generation of the subsequent NACK requests in real-time streaming applications due to poor prediction of the next RTT value. In addition, NACK-based protocols do not have a common RTO estimation scheme that works well in heterogeneous Internet conditions. Despite these drawbacks, many NACK-based protocols are still utilizing the existing RTO estimating protocol, which is borrowed from TCP.

As described above, an RTO estimator is described by two parameters—the number of duplicate packets and the amount of unnecessary time out waiting. However, these two parameters cannot be minimized at the same time as they represent a basic trade-off of the estimator (i.e., decreasing one parameter will increase the other). Since TCP's RTO estimator proves to be inapplicable in NACK-based protocol, there is a need for such protocols to employ the class of optimal RTO estimators, which are described in this patent disclosure.

SUMMARY OF THE INVENTION

The present invention is directed to a method and system for estimating retransmission timeout (RTO) in a real-time streaming applications over the Internet between a server and a client.

The present invention provides a method of estimating retransmission timeout ($RTO_j$) used in a communication system to support multiple retransmission and the method includes the steps of: transmitting a plurality of data packets from a server to a client; transmitting a negative acknowledgment (NACK) packet for retransmission by the client if one of the data packets is missing; computing a round-trip delay ($RTT_i$) corresponding to a latency between sending the NACK packet to the server and receiving the corresponding retransmission of the missing packet from the server; calculating a plurality samples of delay ($\square_j$) between the reception adjacent packets of the plurality of data packets by the client; determining a smoothed inter-packet delay variance ($SVAR\square_j$) based on the calculated delay samples; and, computing the $RTO_j$ based on the determined $RTT_i$ and the determined smoothed inter-packet delay variance.

The present invention provides a system of managing transmission of a plurality of data packets over a communications link between a server system and a client system and includes: a means for receiving the data packets in the form of frame comprised of packets; a means for determining whether any frame packets were lost during transmission; a means for requesting that any lost frame packets be retransmitted; a means for determining a round-trip delay ($RTT_i$) corresponding to a latency between requesting retransmission of the lost frame to the server and receiving the corresponding retransmission of the lost frame from the server; a means for determining inter-burst packet delay variations; and, a means for determining a retransmission timeout ($RTO_j$) based on the determined RTT and the determined inter-burst delay variations.

These and other advantages will become apparent to those skilled in this art upon reading the following detailed description in conjunction with the accompanying drawings.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. Moreover, for the purpose of clarity, detailed descriptions of well-known devices, circuits, and methods are omitted so as not to obscure the description of the present invention with unnecessary detail.

Figure 2:
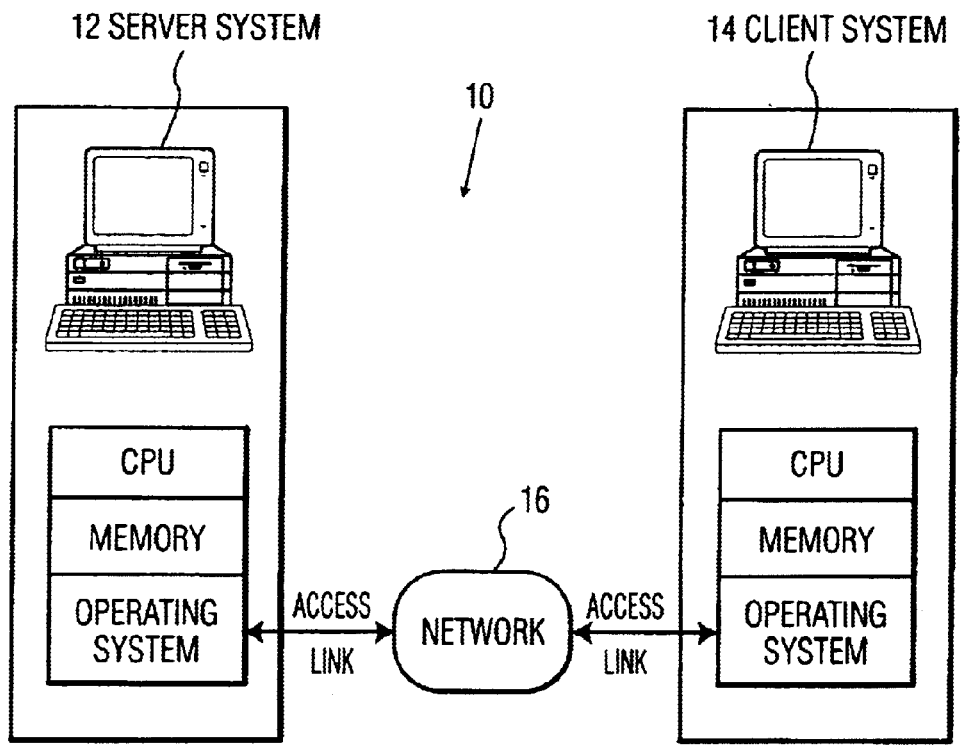
FIG. 2 illustrates a block diagram of a system according to the present invention.

According to an embodiment of the present invention, a mechanism for controlling the retransmission of data packets in a digital communication environment is provided. Referring to FIG. 2, a system 10 which uses the invention comprises a first system 12, such as a server device, a second system 14, such as a client device, which is in communication with each other via access link of the network 16. Preferably, the inventive retransmission mechanism is placed at the client system. As shown in FIG. 2, the present invention can be practiced in a client-server environment, but the client-server environment is not essential.

In this invention, the server system 12 sends at least one source packet or sends packets in bursts to the client system 14 over the network. However, in the event that the source packet or burst packets from the server system 12 to the client system 14 is transmitted in error or lost, the client system 14 transmits a negative acknowledgment (NACK) packet to the server system 12 for retransmission. Then, the client system 14 establishes a limit on the timer period and retransmits the NACK packet to the server system 12 if the requested packet or burst packets are not received within a specified time period.

It should be noted that many real-time streaming servers are implemented to transmit their data in burst packets instead of sending one packet every specified period. This type of burst transmission typically reduces the overhead associated with frequent switching between processors. In addition, the bursty packet transmission is more adapted to handle varying packet sizes and allows more simultaneous streams per server. However, it is not required.

Figure 3:
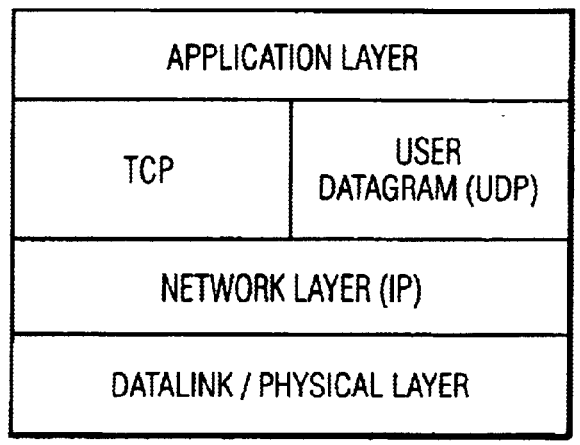
FIG. 3 illustrates the various layers that make up the Transmission Control Protocol/Internet Protocol (TCP/IP)

According to an embodiment of the present invention, packets that are received in error or lost are notified back to the server system 12 by the client system 14 via a NACK packet. Here, a user datagram protocol (UDP) is utilized. FIG. 3 depicts the various layers that make up the Transmission Control Protocol/Internet Protocol (TCP/IP) suite. Basically, TCP provides end-to-end transport services across multiple heterogeneous networks and the delivery of sequenced packets of information across the Internet. UDP is a connection-less transport protocol designed to operate using the service of IP and provides minimal error detection for streams of information. At the network level, IP provides a "datagram" delivery service.

Figure 1A:
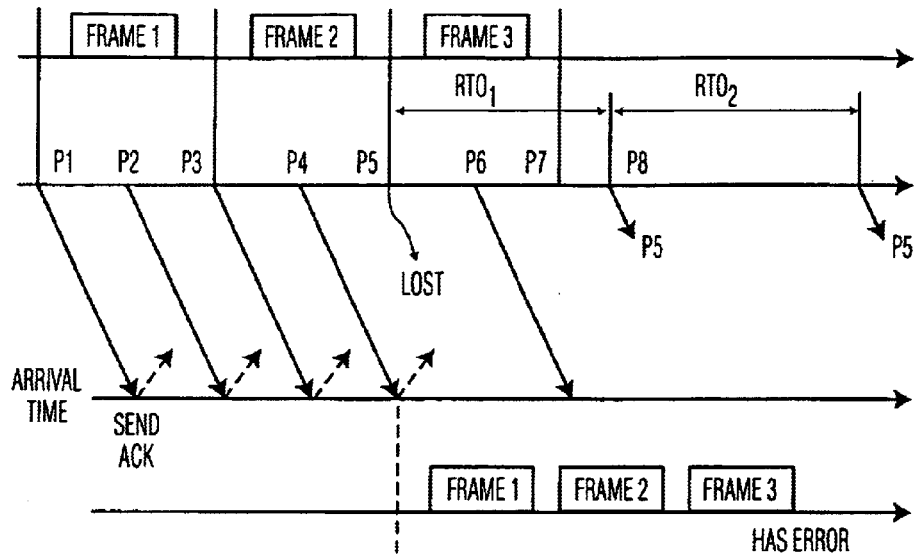
FIG. 1(a) illustrates representative data flows in the TCP communication environment.
Figure 1B:
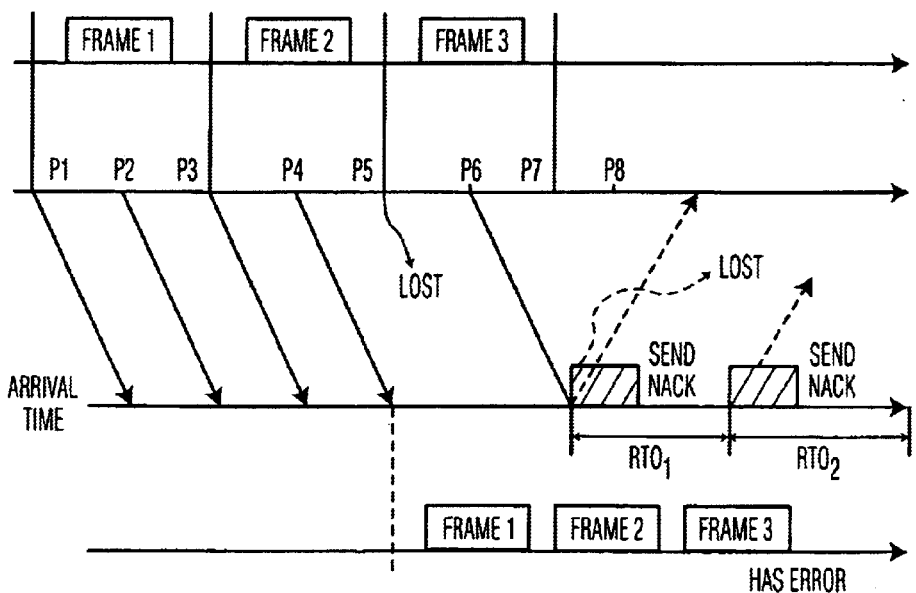
FIG. 1(b) illustrates representative data flows in the UDP communication environment.
Figure 4A:
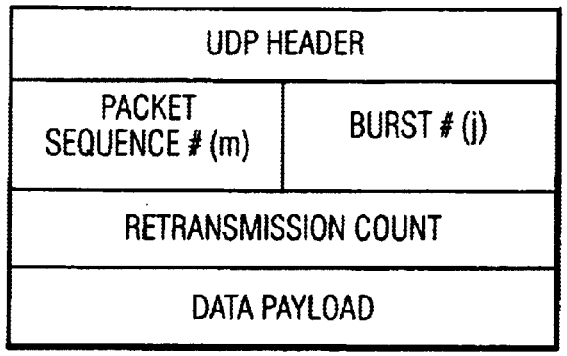
FIG. 4(a) illustrates the format of a user datagram protocol (UDP) packet at the server end in accordance with the present invention.
Figure 4B:
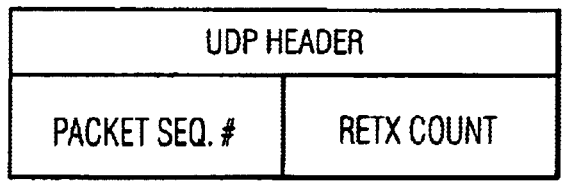
FIG. 4(b) illustrates the format of a user datagram protocol (UDP) packet at the client end in accordance with the present invention.

The format of a UDP packet according to the present invention is shown in FIG. 4(a) and FIG. 4(b). Each packet in a real-time application carries a burst identifier, which allows the receiver to distinguish packets from different bursts. Referring to FIG. 1(b), a NACK packet is send to the server system if the source packet therefrom is lost along the transmission path. The loss of packets is detected by system 14 through gaps in sequence numbers. For each NACK-packet transmitted, the inventive protocol maintains a timer. If the timer expires, the NACK-packet is retransmitted. To avoid the confusion of which retransmission of the same packet actually returned to the client system, the header of each NACK packet contains an extra field specifying the retransmission sequence count in addition to the lost packet sequence number, as shown in FIG. 4(b). Thus, the client system can pair each retransmitted packet with the exact time when the corresponding NACK packet was sent out and properly measure the RTT.

As the source packets are being transmitted over a path with unpredictable delay, the present invention continuously adjusts the threshold at which the retransmit timer expires. That is, the transmission path changes during the lifetime of the connection, and the state of the routers (or switches) also changes as more or less traffic is being carried by the network. Accordingly, the present invention incorporates a new round-trip estimation mechanism that can be used to determine more accurate timing in retransmitting the NACK-packet. Unlike the prior art, estimate of the delay jitters between arriving packets is used in the present invention as the basis to set the retransmit timer threshold.

Figure 5:
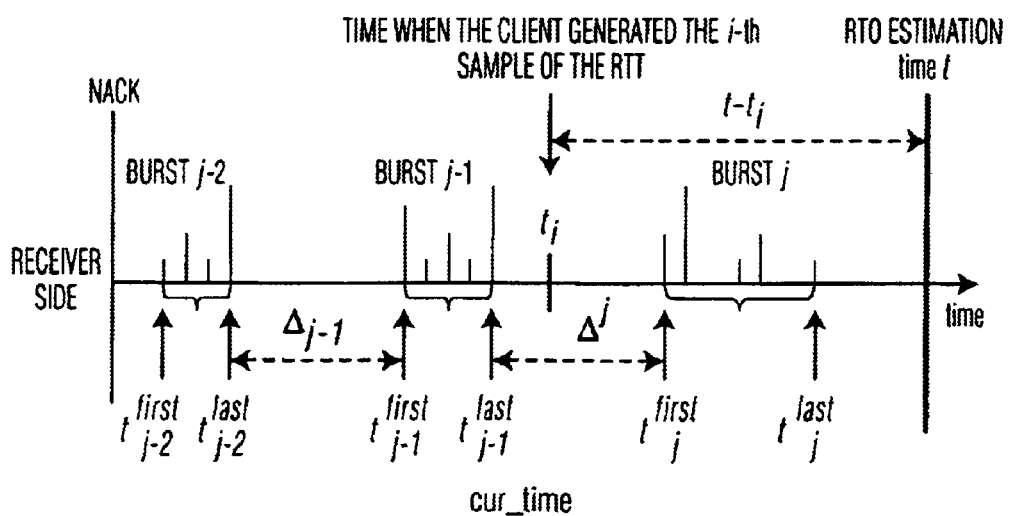
FIG. 5 illustrates a time chart depicting the jitter-based retransmission timeout (RTO) estimation according to the present invention; and, FIG. 6 is a flow chart illustrating the operation of the retransmission timeout (RTO) estimator according to the present invention.

The following description is a detailed description of specific algorithms of a retransmission mechanism according to the present invention. In real time multimedia applications, the server system 12 typically sends packets in bursts for the duration of time, $D_b$. Here, $D_b$ is based on the streaming rate and the average packet size. Referring to FIG. 5, for each burst j, the last packet of the burst arrives to the client at time $t_j^{last}$, and the first packet of the burst arrived at time $t_j^{first}$. Thus, the inter-burst delay for burst j can be defined as below equation 4:

$$\square_j = t_j^{first} - t_k^{last}, \quad (4)$$

where burst k represents the last burst received before burst j (unless there is packet loss, k=j−1). For each burst j, using EWMA formulas similar to those in TCP, the smoothed inter-burst delay $S\square_j$ and smoothed inter-burst delay variance $SVAR\square_j$ are computed as defined in the following equations (5) and (6):

$$S\square_j = \begin{cases} \square_0, & j = 0 \\ (1 - \square_1) * S\square_{j-1} + \square_1 * \square_j, & j \geq 1 \end{cases} \quad (5)$$

and $$SVAR\square_j = \begin{cases} \square_0/2, & j = 0 \\ (1 - \square_1) * SVAR\square_{j-1} + \square_1 * VAR\square_j, & j \geq 1, \end{cases} \quad (6)$$

where $\square_1$ and $\square_1$ represent exponential weights and $VAR\square_j$ represents the absolute deviation of $\square_j$ from its smoothed version $S\square_{j-1}$. Here, $S\square_j$ is typically proportional to the burst duration $D_b$, and thus it cannot be used the same way in real-time applications with a different burst duration. However, the smoothed variance $SVAR\square_j$ is fairly independent of the burst duration and reflects the variation in the amount of cross traffic in the router queues along the path from the server to the client.

With the transmission delay and its delay variation from equation (6), if $T_j$ is the time when the client produced the j-th sample of the inter-burst delay $\square_j$ (ideally, $T_j$ equals $t_j^{first}$) and $t_i$ is the time when the client computed the i-th RTT sample $RTT_i$ (explained later), then the effective jitter-based RTO according to the present invention at time t is:

$$RTO_J(t) = n*RTT_i + m*SVAR\square_j, \quad (7)$$

where i=max: $t_i \leq t$ and j=max: $T_j \leq t$.

Furthermore, in the event that there is a longer delay between the measurements of the RTT, a slight modification to equation (7) can be provided to better approximate the RTO. This better estimator, called $RTO_{JD}$, can be created by incorporating the duration between the time of the last RTT sample (i.e., $t_i$) and the time where the RTO is being estimated (i.e., t) into the $RTO_J$ estimator:

$$RTO_{JD}(t) = (n + k(t - t_i))*RTT_i + m*SVAR\square_j, \quad (8)$$

where i=max: $t_i \leq t$, j=max: $T_j \leq t$, and time units for t and $t_i$ are seconds.

It should be noted that both jitter-based RTO estimators, as described in the preceding paragraphs, achieve optimality when $\square_I = 0.5$, $\square_I = 0.25$, k=0.5, and m=4.2792*n−2.6646. The remaining free parameter n can be used to vary the desired number of duplicate packets on a per-application basis: higher values of n correspond to fewer duplicate packets. The recommended values of n are between 1 and 4. It should be noted that frequent delay jitter samples prove to be very helpful in fine tuning NACK-based RTO estimation and can be used as a good predictor of the changes in the future RTTs.

It should be noted that the estimator of the present invention for determining the retransmission timeout (RTO) can be realized using a processor, microcomputer, an application-specific integrated circuit (ASIC), a programmable device, or any other device designed and operated to provide the functionality described herein. A flow chart of a key operation of the estimator is shown in FIG. 6, as hereinafter explained.

Figure 6:
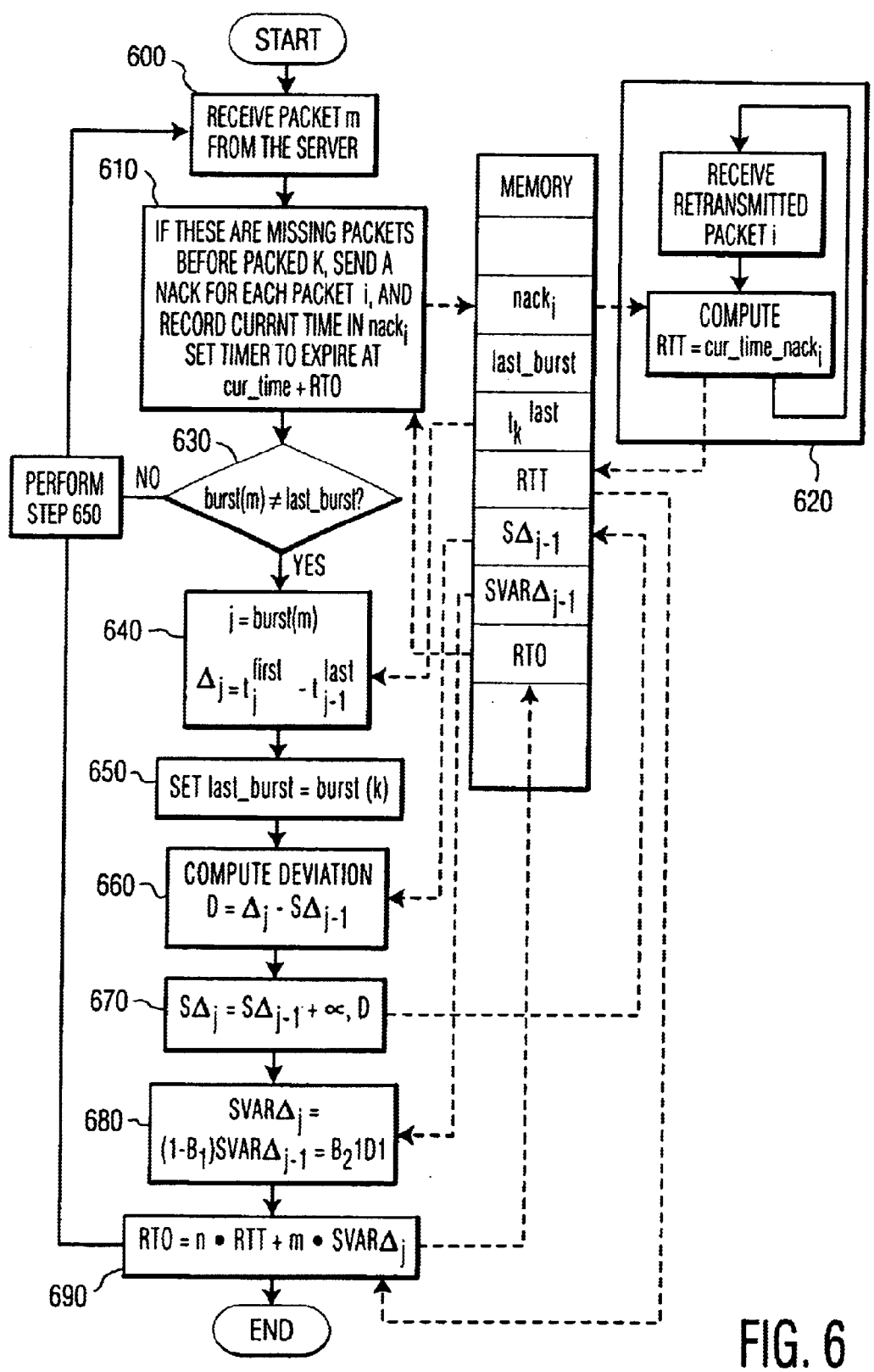

Referring to FIG. 6, each packet is plugged into an estimator algorithm that tracks two quantities: the round trip delay estimate (RTT) and the variance in inter-burst delay jitter ($SVAR\square$). In step 600, each packet is received at the client system. If there were missing packets, a NACK packet for each packet is sent to the service system in step 610. In such a case, the transmission time of each NACK packet requesting a retransmission of packet (i), $nack_i$, is recorded, then the timer to transmit the subsequent NACK packet is set in step 610. Meanwhile, if retransmission of the data packet is reliably completed from the server to the client system, the round trip delay (RTT) is computed in step 620.

According to the embodiment of the present invention, the receiver in a real-time session must periodically measure the round-trip delay. The client system obtains the RTT measurements by utilizing packet loss to measure the round-trip delay—each successfully recovered packet provided a sample of the RTT. That is, the RTT is the duration between sending a NACK and receiving the corresponding retransmission. Alternatively, the RTT is measured by the client by obtaining additional samples of the round-trip delay in cases when network packet loss was too low. To this end, the client periodically transmits simulated retransmission requests to the server if packet loss falls below a certain threshold. In response to these simulated NACKs, the server sends the needed packets to the client.

In step 630, it is determined whether the received packet belongs to the same burst as the previously received packet. If it is different, in step 640, the inter-burst delay is computed, as described in equation 4. The inter-burst delay is measured between the receipt of the first packet of the burst and the last packet of the previous burst at the client side. To distinguish between different bursts and utilize equation (4), the system records the parameters of the last received packet in step 650.

Next, the inter-burst delay samples are averaged into a smoothed inter-burst delay ($S\square$) estimate, which is then used to control the retransmissions time-out parameter (RTO). Using step 660, for each burst, smoothed inter-burst delay and smoothed inter-burst delay variance are calculated in step 670 and 680, respectively. Step 670 is performed to update the smoothed inter-burst delay value, which is used for determining the variance in the subsequent calculation process. These steps are executed according to equations 5 and 6. Hence, as each new packets are added, the mean and variance change.

Finally, the retransmit timeout mechanism (RTO), which is a timeout to prompt retransmission of unrecovered data, is calculated in step 690. The latest RTT sample has the most relevance to the value of the future round-trip delay due to the large spacing between RTT samples in NACK-based applications. Upon expiration of the timer for packet (i), the client system 14 retransmits the NACK packet, nack$_j$, and sets the timer for another RTO time unit for packet (i). The recommended values of n are between 0 and 4, and the value of m is set to: m=4.2792*n−2.6646.

In summary, the present invention provides a new RTO estimation mechanism, which achieves significant performance improvements (i.e., fewer duplicate packets and less unnecessary waiting time) over the existing RTO estimation algorithms when employed in NACK-based protocols. Having thus described a preferred embodiment for managing retransmission over a digital communications link, it should be apparent to those skilled in the art that certain advantages of the system have been achieved. The foregoing is to be constructed as only being an illustrative embodiment of this invention. Thus, persons skilled in the art can easily conceive of alternative arrangements providing a functionality similar to this embodiment without any deviation from the fundamental principles or the scope of this invention.

What is claimed is:

1. A method for estimating retransmission timeout (RTO$_J$) used in a communication system to support multiple retransmission of the same packet between a server and a client, the method comprising the steps of:
   (a) transmitting a plurality of data packets from said server to said client;
   (b) transmitting a negative acknowledgment (NACK) packet for retransmission by said client if one of said data packets is missing;
   (c) computing a round-trip delay (RTT$_i$) corresponding to a latency between sending said NACK packet to said server and receiving the corresponding retransmission of said missing packet from said server;
   (d) calculating a plurality samples of delay ($\Delta_j$) between the reception of adjacent packets of said plurality of data packets by said client;
   (e) determining a smoothed inter-packet delay variance (SVAR$\Delta_j$) based on said calculated delay samples; and,
   (f) computing said RTO$_j$ based on said determined RTT$_i$ and said determined smoothed inter-packet delay variance;
   wherein said SVAR$\Delta_j$ is determined according to SVAR$\Delta_j$=(1−$\beta_1$)*SVAR$\Delta_{j-1}$+$\beta_1$*D and wherein $\beta_1$ being set to 0.25 and D being the absolute difference of $\Delta_j$−SVAR$\Delta_{j-1}$.

2. The method of claim 1, further comprising the step of controlling retransmission of said NACK based on said computed RTO$_j$, said computed RTO$_J$ being a delay between subsequent transmissions of said NACK packet from said client to said server.

3. The method of claim 1, wherein said RTO$_J$ is determined according to $$RTO_J = n*RTT_i + m*SVAR\Delta_j,$$

wherein n being set between 0 and 4 and m being set to m=4.2792*n−2.6646.

4. The method of claim 1, wherein the communication link between said server and said client comprises at least one of a wireless communications link, a wired communication link, and the combination of a wired communication link and a wireless communications link.

5. A method for managing transmission of a plurality of data packets over a communications link between a server system and a client system; the method comprising the steps of:
   (a) transmitting a plurality of burst packets from said server to said client;
   (b) transmitting a negative acknowledgment (NACK) packet for retransmission by said client if one of said burst packets is lost;
   (c) determining a round-trip delay (RTT$_i$) corresponding to the actual time between the transmitting said NACK packet by said client and a determination by said client said lost burst packets was transmitted successfully;
   (d) calculating a plurality samples of inter-burst delay ($\Delta_j$) between the reception of adjacent burst packets of said plurality of burst packets by said client;
   (e) determining a smoothed inter-burst delay variance (SVAR$\Delta_j$) based on said calculated inter-burst delay samples; and,
   (f) computing said RTO$_J$ based on said determined RTT$_i$ and said determined smoothed inter-burst delay variance;
   wherein said SVAR$\Delta_j$ is determined according to SVAR$\Delta_j$=(1−$\beta_1$)*SVAR$\Delta_{j-1}$+$\beta_1$*D and wherein $\beta_1$ being set to 0.25 and D being the absolute difference of $\Delta_j$−SVAR$\Delta_{j-1}$.

6. The method of claim 5, further comprising the step of controlling multiple retransmission of said NACK based on said computed RTO$_j$, said computed RTO$_j$ being a delay between subsequent transmissions of said NACK packet from said client to said server.

7. The method of claim 5, wherein said RTO$_J$ is determined according to $$RTO_J = n*RTT_i + m*SVAR\Delta_j,$$

wherein n being set between 1 and 4 and m being set to m=4.2792*n−2.6646.

8. The method of claim 5, wherein said communication link between said server and said client comprises at least one of a wireless communications link, a wired communication link, and the combination of a wired communication link and a wireless communications link.

9. A system for estimating retransmission timeout (RTO) used in a communication system to support multiple retransmission of the same packet between a server system and a client system, comprising:
   means for controlling said multiple retransmissions of a data packet between said server system and said client system over said communication link based on an actual around-trip delay (RTT) and a smoothed inter-packet delay variance (SVAR$\Delta_j$) associated with said client system, said RTT being a latency between sending a negative acknowledgment (NACK) packet to said server system responsive to a lost packet and receiving the corresponding retransmission of said lost packet from said server, said smoothed inter-packet delay variance (SVAR$\Delta_j$) being variation of delays before and after each received packet or burst of packets, wherein said SVAR$\Delta_j$ is determined according to SVAR$\Delta_j$=(1−$\beta_1$)*SVAR$\Delta_{j-1}$+$\beta_1$*D and wherein $\beta_1$ being set to 0.25 and D being the absolute difference of $\Delta_j$−SVAR$\Delta_{j-1}$.

10. A system for managing transmission of a plurality of data packets over a communications link between a server system and a client system, comprising:
   means for receiving said data packets in the form of frame comprised of packets;
   means for determining whether any frame packets were lost during transmission;
   means for requesting that any lost frame packets be retransmitted;

means for determining a round-trip delay ($RTT_i$) corresponding to a latency between requesting retransmission of said lost frame to said server and receiving the corresponding retransmission of said lost frame from said server;

means for determining inter-burst packet delay variations;

means for determining a retransmission timeout ($RTO_j$) based on said determined RTT and said determined inter-burst delay variations;

means for determining inter-burst delay ($\Delta_j$) between the reception of a first packet of said lost burst packets and a last packet of a prior burst packets; and, means for determining a smoothed inter-burst delay variance ($SVAR\Delta_j$), wherein said $SVAR\Delta_j$ is determined according to $SVAR\Delta_j=(1-\beta_1)*SVAR\Delta_{j-1}+\beta_1*D$ and wherein $\beta_1$ being set to 0.25 and D being the absolute difference of $\Delta_j-SVAR\Delta_{j-1}$.

11. The system of claim 10, further comprising a means for controlling multiple retransmission of said NACK based on said computed $RTO_j$, said computed $RTO_j$ being a delay transmission of said NACK packet from said client to said server.

12. The system of claim 10, wherein said $RTO_j$ is determined according to $$RTO_j = n*RTT_i + m*SVAR\Delta_j,$$

wherein n being set between 1 and 4 and m being set to m=4.2792*n−2.6646.

* * * * *